Patented Sept. 14, 1937

2,092,838

UNITED STATES PATENT OFFICE 2,092,838

PIGMENT AND PROCESS OF MAKING

Henry A. Gardner, Washington, D. C.

No Drawing. Application April 17, 1936,
Serial No. 75,015

9 Claims. (Cl. 134—58)

This invention relates to the improvement of pigments (white or colored) from the standpoint of the "chalking" and/or tint-failure characteristics of the film-forming coating compositions containing them. The invention is concerned with certain novel pigmentary products, with the method of their production, and with coating compositions containing them.

It is known that when titanium oxide or zinc sulphide pigments are exposed as paints, they "chalk" with rapidity: also that when they are mixed with, or precipitated upon, inert pigments, such as barium sulphate, calcium sulphate, calcium carbonate, and the like, they exhibit similar undesirable results. This has, in the past, greatly lessened their use in tinted paints, since naturally paints fade when severe "chalking" takes place.

An object of the invention is to provide a method of minimizing the "chalking" tendencies of pigments known normally to have the same. Another object is the provision of pigmentary compositions having improved characteristics in the respects above noted.

I have found that the above defects may be eliminated or at least largely reduced by submerging the "chalking" pigment in a crystalline matrix or base during the process of hydration and solidification of the matrix or base, whereby the pigment particles become interlocked in the crystals formed in the matrix or base upon solidification, and then subdividing the resulting mass to a fineness of particular size suitable for paint production. Pigments thus produced from titanium or zinc sulphide will then have present substantial quantities of the inert associated material, but they resist chalking and may be used in colored paints without early failure of the color.

While the invention is described with particular reference to a treatment of titanium oxide pigment or zinc sulphide pigment, it is to be understood that the method is of wider application, extending to many white and colored pigments known to possess "chalking" tendencies.

For the "inert crystalline matrix" I employ a setting mass of calcareous or siliceous material such as Portland cement, other hydraulic cements, or plaster of Paris. By "Portland cement" I mean the artificial chemical cementitious product consisting essentially of di-, and tri-, calcium silicates with minor amounts of calcium aluminates and calcium ferrites. By the expression "other hydraulic cements" I mean to include aluminate cements, ferrite cements, hydraulic limes, natural cements, slag cements and similar burned and unburned cementitious materials having hydraulic properties.

The invention will be described with greater particularity with reference to the following illustrative examples:

Example 1

300 grams of white Portland cement is made into a slurry with the addition of sufficient water, and 100 grams of titanium oxide pigment or of zinc sulphide pigment is stirred into this slurry. The mixture is allowed to stand until it sets to a firm, solid mass. During this process, hydrated di- and tri- calcium silicates are understood to be formed by the cement and surround and interlock the crystals of titanium or zinc sulphide pigment. The hard mass is then broken up and ground to a fine white powder.

It may on occasion be desirable subsequently to treat this powder with a small amount of dilute sulphuric acid, if it is desired to convert calcium hydrate, which may have been set free in objectionable amount during the reaction, to calcium sulphate, which latter is a better pigmentary material than calcium hydrate. The main portion of the mass, however, consists of hydrated di- and tri- calcium silicates surrounding particles of the zinc, or the titanium, pigment.

Example 2

In the making of highly colored or light-tinted titanium or zinc sulphide pigments, for instance, when a series of creams, grays, reds or greens are desired, which may be used in such form, I may proceed in the following manner: To 300 grams of white or ordinary gray colored Portland cement (according to the color desired) I add sufficient water to make a slurry, and then add 100 grams of titanium oxide pigment or of zinc sulphide pigment. I then add red oxide of iron, black oxide of iron or carbon black, chromium hydroxide, sienna, umber or ocher, or other solid coloring matter, or mixtures of such colors. Usually from 5 to 50 grams of these various colored pigments are sufficient to give pleasing tints or colors. The mixture is then allowed to stand until it sets to a firm, solid mass, so that the silicates formed surround and interlock the crystals of titanium or zinc sulphide pigment and the added color pigment. The hardened mass is then broken up and ground to a finely divided colored powder. Colored powders produced in this fashion may be ground in oil or other liquids to form paints of very permanent tint retention properties.

*Example 3*

300 grams of plaster of Paris (calcium sulphate) is made into a slurry with the addition of sufficient water. 100 grams of titanium oxide pigment, or zinc sulphide pigment, is then added, and thoroughly stirred into the slurry, which latter is allowed to stand until it has set to a hard mass. This usually requires at least 30 minutes and sometimes a longer period. The resulting hard mass is broken up and then ground to form a finely powdered pigmentary product. The product is ready for use in paint, but it may, if so desired, be partially dehydrated or otherwise treated before use in this direction.

As will be appreciated from the foregoing, Example 2 above may, within the scope of this invention, be altered by substitution of substantially equal amounts of plaster of Paris for the white or gray colored Portland cement recited in that example, whereby finely divided colored powders of desirable pigmentary properties are produced.

It will be appreciated, also, that the 3 to 1 ratio, between cementitious ingredient and pigmentary titanium or zinc ingredient, of the previous examples may be varied within reasonable limits while still realizing the advantages of this invention. Where the ratio exceeds about 4 to 1, an undesirable dilution of the pigment results, whereas when the ratio drops below about 1 to 1 the effect of the encrusting cemetitious material on the "chalking" property of the pigment ingredient is or may be undesirably weakened.

It is probable that during the above hydration reactions, wherein solid masses are formed which must be powdered before use, the pigment particles are surrounded by, and immersed in, the crystals which are formed during the hydration reaction, and become a part thereof in such a manner that they can no longer exhibit their "chalking" or tint failure properties.

Pigments other than titanium oxide and zinc sulphide, e. g., zinc oxide, white lead, lead chromate, and various colored mineral pigments, are improved by this method.

Pigmentary products so produced may be incorporated in known manner in the usual menstrua to form paints, enamels, and other pigmented film-forming coating compositions.

I claim:

1. Process of improving the properties of a white pigment of the group consisting of titanium oxide pigments and zinc sulphide pigments from the standpoint of chalking in pigmented film-forming coating compositions, which comprises forming an aqueous slurry of an inorganic cementitious substance of the group consisting of hydraulic cements, hydraulic limes and plaster of Paris, dispersing the pigment particles in the slurry, hardening the pigmented slurry by hydration of the cementitious substance, and crushing and powdering the hardened pigmented slurry to a particle size suitable for incorporation into a film-forming coating composition.

2. Process as defined in claim 1, in which the pigment consists essentially of titanium oxide.

3. Process as defined in claim 1, in which the cementitious material is Portland cement.

4. Process as defined in claim 1, in which the mineral pigment consists essentially of titanium oxide and in which the cementitious material is Portland cement.

5. Process as defined in claim 1, in which at least one coloring material in solid form is added to the slurry prior to the hardening of the latter.

6. A finely divided pigmentary product comprising a white pigment of the group consisting of titanium oxide pigments and zinc sulphide pigments and a hydrated and hardened inorganic cementing material produced from a member of the group consisting of hydraulic cements, hydraulic limes, and plaster of Paris, the individual particles of the finely divided pigmentary product consisting essentially of particles of the said white pigment in inert crystalline matrices of the hydrated and hardened inorganic cementing material.

7. Product as defined in claim 6, in which the pigment consists essentially of titanium oxide.

8. Product as defined in claim 6, in which the mineral pigment consists essentially of titanium oxide and in which the cementitious material is Portland cement.

9. Product as defined in claim 6, in which the pigmentary product contains, in addition to the white pigment, a finely divided solid coloring material, the pigmentary product being colored thereby.

HENRY A. GARDNER.